C. H. MORGAN.
Reel for Coiling Wire-Rods.

No. 224,941. Patented Feb. 24, 1880.

UNITED STATES PATENT OFFICE.

CHARLES H. MORGAN, OF WORCESTER, MASSACHUSETTS.

REEL FOR COILING WIRE RODS.

SPECIFICATION forming part of Letters Patent No. 224,941, dated February 24, 1880.

Application filed February 20, 1879.

*To all whom it may concern:*

Be it known that I, CHAS. H. MORGAN, of the city and county of Worcester, and Commonwealth of Massachusetts, have invented certain new and useful Improvements in Reels for Automatically Coiling Wire Rods; and I do hereby declare that the following is a full, clear, and exact description of the same, reference being had to the accompanying drawings, forming a part of this specification, and in which—

Figure 1:
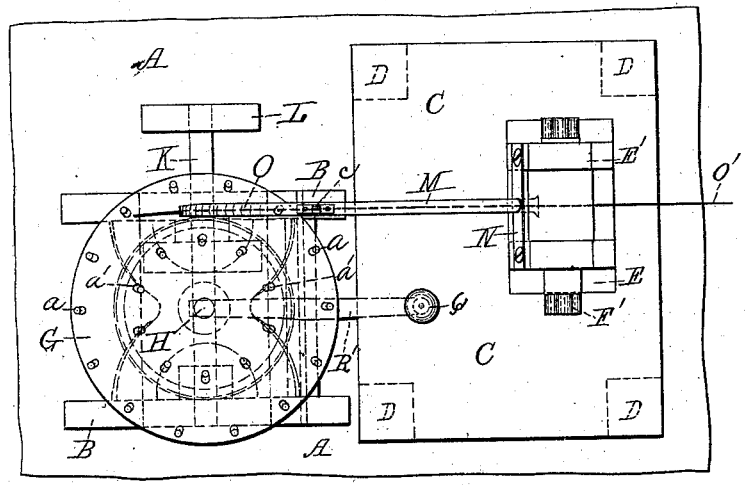
Figure 2:
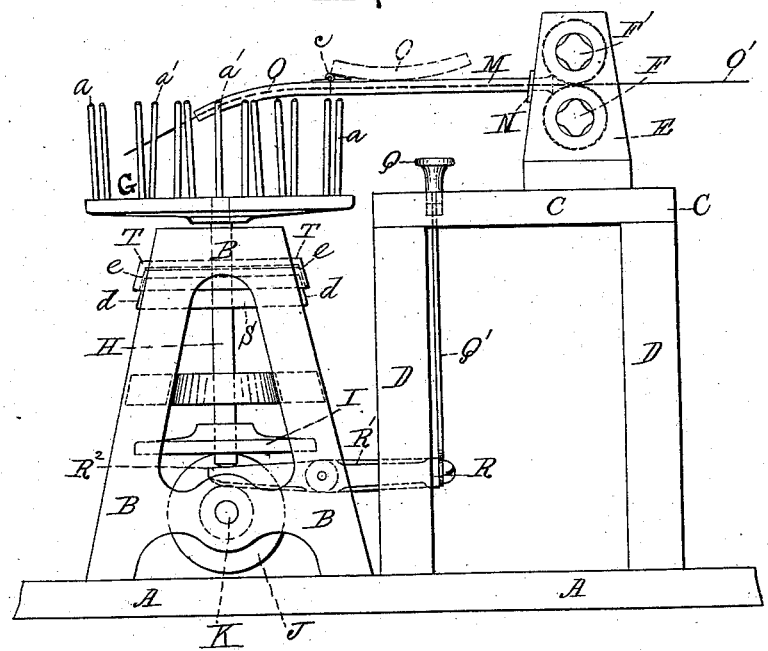

Figure 1 represents a top or plan view of a reeling-machine embracing my said improvements, as will be hereinafter more fully explained; and Fig. 2 represents a side view of the parts shown in Fig. 1, looking in the direction indicated by arrow 1 of the same figure.

To enable those skilled in the art to which my invention belongs to make and use the same, I will proceed to describe it more in detail.

In the drawings, A represents the foundation or bed of the machine, upon which is arranged and secured the reel-supporting frame B. Upon flooring C, which, in this instance, is supported by standards D, are arranged and secured housings E E' of finishing-rolls F F', which rolls are arranged to turn in suitable bearings formed in said housings.

The reel G is secured upon the upper end of a vertical shaft, H, which is fitted to turn in bearings formed in frame B, and provided with a friction wheel or pulley, I, secured upon its lower end, by which it, together with its reel G, is driven from a friction-pulley, J, on shaft K, which is driven by a pulley, L.

Reel G is provided with a double set of arms, $a$ $a'$, instead of one, as in ordinary reels now in use. The arms $a$, forming the outer row, may be secured in the reel upon an incline from the center, while the arms $a'$, forming the inner row, may be inclined toward the center of the reel, thereby enabling the finished coils to be more easily removed than if the arms were secured vertically in said reel.

As the wire rod O' passes forward from between the last set or finishing-rolls F F' of a continuous or other rod-rolling mill, it first enters and passes through a stationary guide-pipe, M, secured to plate N, which, in turn, is secured to housings E E'; thence into and through the hinged pipe O, and is delivered upon the rapidly-revolving reel G about midway between the arms $a$ $a'$ of the same, as represented in the drawings. Said drawings represent the rod O' as just passing out of the end of jointed guide-pipe O.

Guide-pipe O is jointed at the point $c$, for the purpose of allowing it to be swung over, as represented by dotted lines, Fig. 2, to remove the finished coils, as hereinafter more fully explained.

The velocity of reel G may be varied to a greater or less speed by simply changing friction driving-pulley J upon shaft K, so as to bring it nearer to or farther from the axis of said reel.

A rod having been coiled upon reel G between the arms $a$ $a'$, the reel is stopped by the operator pressing upon the upper end or handle, Q, of a vertical rod, Q', the lower end of which is secured to the outer end, R, of a horizontal lever, R', thereby depressing said outer end, R, and raising its inner end, $R^2$, which presses against the lower end of the reel-shaft, which operation raises friction-pulley I off of the friction-pulley J. At the same time that pulley I is raised off of pulley J another beveled friction-pulley, S, also secured upon shaft H, is forced up so as to bring the beveled side $d$ against the under beveled side, $e$, of the circular part T, formed or secured upon framework B, and the reel is thereby quickly stopped. The operator can now, by means of suitable mechanism arranged for that purpose, lift the coil from the reel, when the operation of coiling other rods is repeated.

I am aware that a reel having one set of arms and an outer case is claimed in a pending application of myself and Fred H. Daniels, the same being our joint invention.

Any other similar and convenient method for stopping the reel may be employed, if preferred, and instead of having one reel, as herein described, and shown in the drawings, the reeling apparatus may be arranged with two or more reels without departing from the principle of my invention, and said reels may be arranged so that they can be alternately brought into position for receiving and coiling the rods; or the guiding tube or pipe may be arranged so that it can be moved to deliver the finished rods to either of the reels, as occasion may require.

The friction wheels, disk, and lever for operating and stopping the reel form the subject-matter of a claim in an application previously filed by me—viz., on January 22, 1879.

Having described my improvements in reels for automatically coiling wire rods, what I claim therein as new and of my invention, and desire to secure by Letters Patent, is—

A reel for coiling iron and steel wire rods as they are delivered from the finishing-rolls of a rolling-mill, consisting of two sets of arms, $a$ $a'$, secured to a rotating base and arranged in relation to each other substantially as and for the purposes set forth.

CHAS. H. MORGAN.

Witnesses:
 THOS. H. DODGE,
 EDWIN E. MOORE.